Jan. 27, 1931. W. J. HAWKINS 1,790,347
METHOD AND APPARATUS FOR MIXING DOUGH
Filed July 3, 1929 2 Sheets-Sheet 1
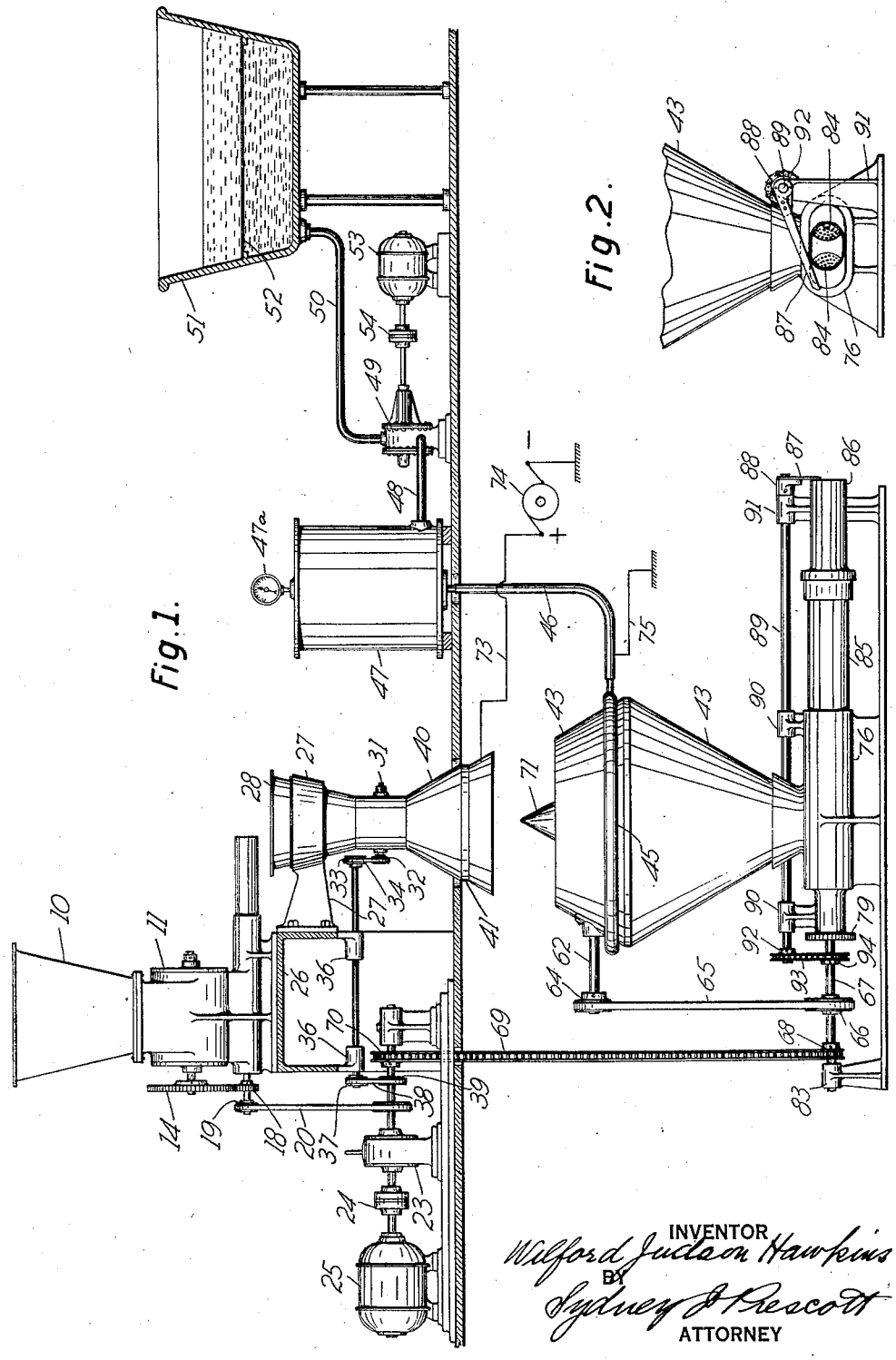
INVENTOR
Wilford Judson Hawkins
BY
Sydney J. Prescott
ATTORNEY

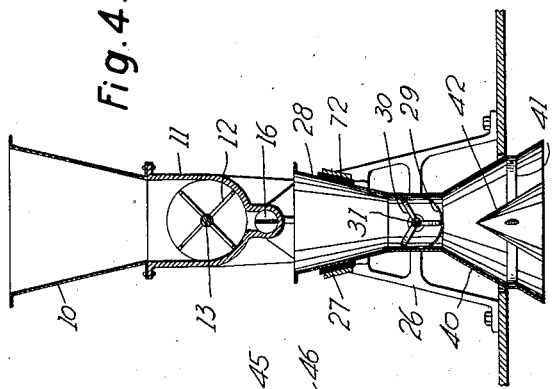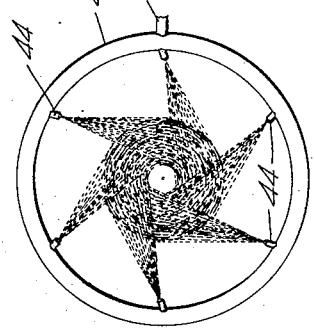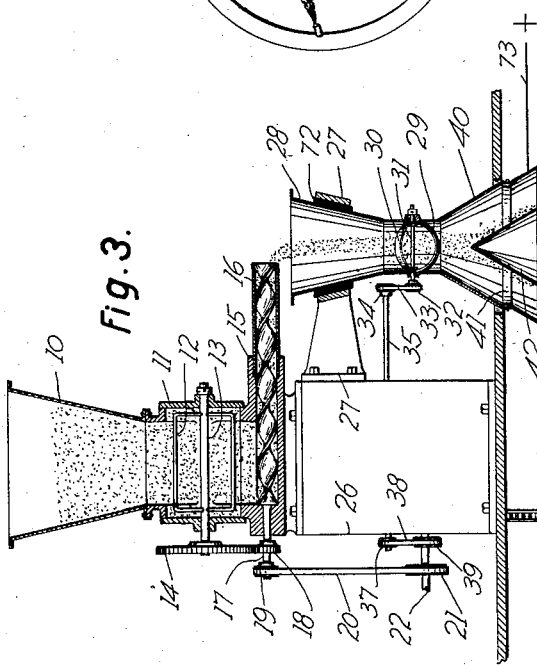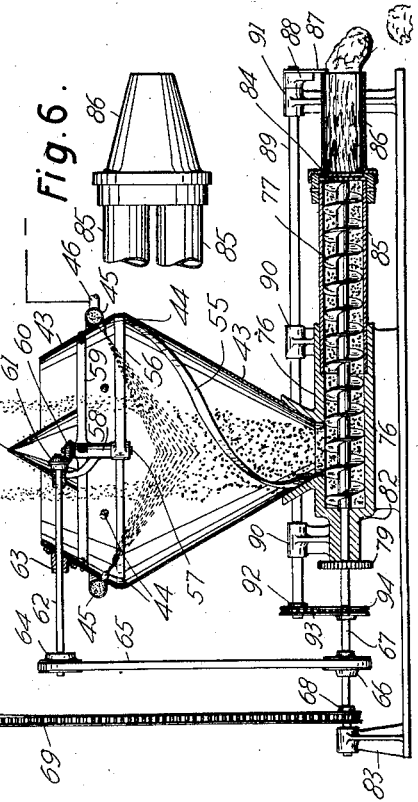

Patented Jan. 27, 1931

1,790,347

UNITED STATES PATENT OFFICE

WILFORD JUDSON HAWKINS, OF CLAIBORNE, MARYLAND, ASSIGNOR TO AMERICAN MACHINE & FOUNDRY COMPANY, A CORPORATION OF NEW JERSEY

METHOD AND APPARATUS FOR MIXING DOUGH

Application filed July 3, 1929. Serial No. 375,801.

This invention relates to a method and apparatus for mixing powdered solid materials with liquids, and particularly for continuously mixing such ingredients, little by little, without resorting to the usual batch mixing. The invention has been found particularly applicable to the mixing of dough for bread stuffs.

From time immemorial to the present day, it has been the practice to mix the dough in batches by placing measured quantities of the liquid and solid ingredients for making dough in the trough of a mixer in which the ingredients are mixed and kneaded for the considerable length of time necessary to insure thorough mixing and to make certain that no lumps of unmixed flour are left. When mixing was completed, it was necessary to get the dough out of the mixer, transfer it to a dough divider for cutting the dough into pieces, and then place the pieces in the receptacles in which the bread is proofed and baked. It will be seen that for a considerable portion of the time the mixers are out of operation, decreasing their daily capacity, and that the dough is subjected to considerable handling. These mechanical mixers consume considerable power, adding appreciably to the cost of this universally used article of food. Much of the kneading and beating to which the dough is subjected in the usual method of mixing, is unnecessary to proper kneading of the dough, being required merely to insure thorough mixing and to eliminate dry or unmixed lumps of flour, which result from throwing together large quantities of unmixed flour and liquid at a time.

It is, therefore, the object of the present invention to provide a practical method and apparatus for continuously mixing powdered and liquid ingredients little by little to produce good dough with little kneading and to obviate the above disadvantages of batch mixing. The greatest difficulties which are encountered in securing such mixing lie, first, in getting a rapid and yet complete physical union of the flour and liquid and, secondly, in collecting and carrying away the sticky dough particles without clogging in and about the mixing position. Generally speaking, the first difficulty is overcome by dropping the flour in a loose free stream and into a whirlpool of spray formed by converging spray nozzles directed into and across the stream of flour, thus producing lateral as well as longitudinal turbulence whereby the liquid and solid particles are driven into contact and intimately mixed. It was also discovered that electrically charging the powdered and liquid ingredients, while unnecessary in most cases, would aid such mixing. The second principal difficulty is overcome by mixing the liquid with a free stream of the flour, that is a stream which is unconfined and therefore not close to any retaining walls on which sticking of the dough particles might clog the stream, and by providing a relatively large collecting casing having continuously operating scraping means for collecting and forwarding the dough particles as fast as formed.

Thus the principal object of the invention is to bring the solid and liquid ingredients of the dough together in such a state and under such conditions that they will completely and intimately mix to form dough, and to provide apparatus whereby this process may go on indefinitely without clogging. Still another object is to produce a better mixing of the ingredients than is possible with batch mixing, and to avoid unnecessary and excessive kneading and beating of the dough. Another object is to reduce power consumption. Still other objects are to provide means for collecting the dough particles as fast as mixed, to form them into a mass, and to cut the mass into dough pieces suitable for baking without unsanitary handling or labor consuming transfers.

With these and other objects not specifically mentioned in view, the invention consists in certain constructions and combinations which will be hereinafter fully described and then more particularly pointed out in the appended claims.

In the accompanying drawings in which like characters of reference indicate the same or like parts:

Fig. 1 is a side elevation, partly in section, of a machine embodying the invention;

Fig. 2 is a detail end elevation, partly in section, of the machine shown in Fig. 1;

Fig. 3 is a sectional side elevation of the dough mixing machine shown in Fig. 1;

Fig. 4 is a sectional end elevation of the dough mixing machine shown in Fig. 1;

Fig. 5 is a detail plan view of the liquid spraying device shown in Fig. 1; and

Fig. 6 is a detail plan view of the dough extruding nozzle shown in Fig. 1.

In the apparatus employed in carrying the invention into effect, there is provided a device for feeding a stream of loose flour, mechanism for spraying a liquid into said stream, and means for collecting the resulting dough particles into a mass. In the best constructions, this apparatus includes a flour sifter. In the preferred form, the spray mechanism includes convergingly directed spray nozzles, and these spray nozzles are preferably directed tangentially with respect to a circle in the flour stream. In the best form, means are provided for cutting pieces from the mass of dough as fast as it is formed. The method employed in carrying the invention into effect consists in feeding the powdered solid ingredients in a loose free stream and spraying the liquid ingredients into said stream in a direction transverse to the path of the powdered ingredients to create lateral turbulence therein, thus more thoroughly mixing the solid and liquid particles. Preferably, the liquid ingredients are sprayed in such a manner as to form a whirlpool of liquid spray and the solid ingredients are directed into said whirlpool. The above means may be widely varied in construction within the scope of the claims, for the particular structure selected to illustrate the invention is but one of many possible concrete embodiments of the same. The invention, therefore, is not to be restricted to the precise details of the structure shown and described.

Referring to the drawings, a device is shown for continuously and uniformly dropping a stream of loose flour consisting of a flour feeding mechanism and a flour sifter receiving flour therefrom. The flour feeding mechanism consists of a hopper 10 mounted on a feed drum 11 in which agitator 12 revolves on a shaft 13 carrying the drive gear 14. Under the feed drum, and in communication with it is a conveyor tube 15 in which a conveyor screw 16 revolves, the latter being driven by a pulley 19 and belt 20 from the pulley 21 on the main drive shaft 22. This shaft 22 is driven through an adjustable speed reducing mechanism 23 and a coupling 24 from the motor 25. A gear 18 on the shaft 17 drives the agitator 12. The flour feeding mechanism as a whole is mounted on a base 26 to which is also secured the supporting arm 27 on which is suspended the flour sifter. This flour feed is designed to feed the flour at a uniform rate, which may be regulated by adjusting the speed of rotation of shaft 22 to feed the correct proportion of flour with respect to the liquid fed into it as hereinafter described.

The flour sifter is provided with a funnel 28 under the open end of the flour feed tube 15. At the lower end of the funnel is a semispherical screen 29 in which is rotatably mounted the agitator 30 on a shaft 31 driven by a pulley 32 and belt 33 from a pulley 34 on the shaft 35 journaled at 36 in the support 26.

The flour, as it drops in a uniform stream from the sifter, is spread into a hollow cylindrical formation by a conical member 42 secured by a spider 41 within the conical outer housing 40 which leads from the lower end of the funnel 28. This serves to further separate the individual particles of flour which naturally spread apart as the flour is dropped in a free stream which, as is apparent from Fig. 3, is not confined by any nearby walls and therefore cannot be clogged by wet flying dough particles. For the same reasons, the conical casing 43 in which the spraying and mixing of liquid and flour takes place, is made much wider than the stream of flour.

In order to rapidly and completely unite and mix flour particles and any other solid ingredients of the dough with the liquid ingredients of the dough, means are provided for spraying a liquid in finely divided form across the flour stream so as to produce lateral turbulence and thus drive the flour and liquid particles into contact. This means includes a plurality of equally spaced converging spray nozzles 44 in a pipe ring 45 surrounding the upper and widest portion of the conical casing. These spray nozzles are so positioned, as shown in Fig. 5, that the sprays issuing from the same are tangent to a common circle within the path of the flour stream, thus forming a whirlpool of finely divided liquid particles into which the flour is directed. In this miniature cyclone the liquid and solid particles are intermingled so as to cause the same to thoroughly mix very rapidly, indeed almost instantaneously. This mixing may be made even more rapid, the formation of dust eliminated and materials resisting mixture with liquids caused to mix, by oppositely charging the solid and liquid particles with electricity, by means hereinafter described.

The liquid ingredients used in the dough, such for instance as milk, water, dissolved salt, etc., are supplied under pressure to the pipe ring 45 through a pipe 46 from a pressure tank 47, which in turn receives its supply through a pipe 48, by means of a pump 49, the inlet of which is connected by a pipe 50 to a supply tank 51 in which the liquid ingredients are mixed. The tank 51 is equipped with a strainer 52. The pump 49 is driven by a motor 53 coupled thereto at 54. The speed of this motor may be regulated in any well known fashion in order to maintain pressure in the tank as shown by gauge 47a, at that pressure which supplies liquid in correct proportion to the flour fed as already described.

The wet particles of dough formed by the intersection of the streams of spray with the stream of flour, collect on the lower portions of the conical casing 43, being laterally displaced by the force of the spray or dropped straight down into the opening at the lower end thereof. These dough particles are scraped off of the casing 43 by a rotating spiral scraper 55 which is attached by the arm 56 to vertical shaft 57 journaled at 58 in spider 59 and driven by gears 60 and 61 and shaft 62, the latter shaft being journaled at 63. The shaft 62 is driven by pulley 64 and belt 65 from pulley 66 on a shaft 67, which shaft is in turn driven by sprocket 68 and chain 69 from a sprocket 70 on the main drive shaft 22. The gears 60 and 61 and bearing 58 are protected from the descending flour and the flour kept properly spread by a cone shaped cover 71.

To provide for giving opposite electric charges to the solid particles and the liquid particles, the sifter funnel and connected parts are insulated from the liquid spraying parts in any suitable way. As shown, the sifter funnel is insulated from the bracket 27 by a non-conducting bushing 72 and is connected through a lead 73 with the positive terminal of a high potential (for instance several thousand volt) direct current source 74, the negative pole of which is grounded. The pipe ring 45 supplying the nozzles 44 is likewise grounded as indicated at 75, in Fig. 1, while the cover 71, spider 59 and shaft 62 are insulated preferably by making the upper portion of the housing 43 of non-conducting material. The shaft is insulated by using fiber or raw hide teeth on one or more of the gears 60 and 61, while the belts 33 and 65 insulate the electrically charged parts of the device from the metallic portion of the drive. By the above means a difference in electrical potential exists between the solid and liquid particles which causes a positive attraction between them.

While desirable, this electrical charging attachment is not ordinarily necessary, and when not used, the casings 28, 40 and 43 may be made in one structure and all insulation omitted.

Cooperating with the casing 43 and the scraper 55 to collect and form the dough particles into a mass is a conveyor arranged to receive the dough at the bottom opening of the casing. This conveyor is positioned within a dough receiving chamber having side by side twin bores in which are right and left hand conveyor screws 77 and 78, each rotated in opposite direction by gears 79 and 80 mounted on the screw shafts 67 and 81 respectively. These shafts are journaled in bearing head 82 of the chamber 76, the shaft 67 being provided also with an outer bearing 83. Movement of the screws 77 and 78 pushes the dough together into a continuous mass, which mass is fed through perforations of dies 84 mounted in the ends of the extension tubes 85 of the twin bores of the chamber 76. This action has the effect of kneading the dough and making same of uniform consistency. This comparatively slight amount of kneading is sufficient because of the thorough particle by particle mixing which the liquid and flour has previously received, as above described. The spaghetti like strings which pass out of the perforations are then united into a compact mass by means of a tapered extruding nozzle 86, from the outer end of which dough pieces of proper size for packing are continuously cut as fast as fed therefrom. It will be seen that the aforesaid conveying mechanism simultaneously conveys the dough from the mixer and forms it into a mass ready for the cutting operation.

The dough dividing or cutting device comprises a rotating knife blade 87 mounted on a crank 88 fixed to a shaft 89 journaled at 90 and 91. The shaft 89 is driven through sprocket 92 and a chain 93 from a sprocket 94 on the conveyor shaft 67. Since the latter shaft is driven from the main shaft 22 which controls the feeding and mixing, the knife operates in timed relation with the delivery of the dough and, therefore, uniform lumps of equal weight will be cut off at the nozzle 86.

The method employed in mixing dough in accordance with the invention and carried out in the apparatus fully described above is as follows: The powdered solid ingredients of the dough are dropped free or unconfined in a stream and particles thereof are spread into a loose curtain like cylindrical formation, and the proper proportion of liquid ingredients is then sprayed in converging directions from points surrounding the stream, these sprays being directed across the flour stream in directions tangent to a horizontal circle within the stream. This produces a lateral turbulence in the form a whirlpool in which the liquid and solid particles are thoroughly mixed and united. The dough particles so formed are caught by a conical casing which surrounds but does not confine or contact the flour stream, and are scraped from the surface of this casing, collected in a mass, kneaded slightly, extruded from a constricted opening and cut to uniform size suitable for baking.

What is claimed is:

1. The combination with a device for feeding a stream of loose flour, of mechanism for producing a whirlpool of spray intercepting said stream, and means for collecting the resulting dough particles into a mass, said device including means for spreading the flour prior to spraying.

2. The combination with a device for feeding a stream of loose flour, of mechanism for producing a whirlpool of spray intercepting said stream, and means for collecting the resulting dough particles into a mass, said means including means for spreading the flour into a cylindrical stream prior to spraying.

3. The combination with a device for feeding a stream of loose flour, of mechanism for producing a whirlpool of spray intercepting said stream, and means for collecting the resulting dough particles into a mass, said mechanism including convergingly directed spray nozzles.

4. The combination with a device for feeding a stream of loose flour, of mechanism for producing a whirlpool of spray intercepting said stream, and means for collecting the resulting dough particles into a mass, said mechanism comprising a plurality of spray nozzles directed across said stream and a source of supply of liquid under pressure connected to said nozzles.

5. The combination with a device for feeding a stream of loose flour, of mechanism for producing a whirlpool of spray intercepting said stream, and means for collecting the resulting dough particles into a mass, said mechanism including nozzles directed tangentially with respect to a circle in said stream.

6. The combination with means for continuously feeding a stream of loose flour, of means for producing a whirlpool of spray intercepting said stream to produce lateral turbulence of the flour and liquid.

7. The method of making dough which consists in feeding the powdered solid ingredients in a loose stream and producing a whirlpool of spray intercepting said stream to create lateral turbulence therein.

In testimony whereof, I have signed my name to this specification.

WILFORD JUDSON HAWKINS.